United States Patent
Block et al.

(10) Patent No.: US 7,120,350 B2
(45) Date of Patent: Oct. 10, 2006

(54) INTEGRATED WAVEGUIDE PHOTODETECTOR

(75) Inventors: Bruce A. Block, Portland, OR (US); Paul Davids, Portland, OR (US)

(73) Assignee: Intel Corporation, Santa Clara, CA (US)

(*) Notice: Subject to any disclaimer, the term of this patent is extended or adjusted under 35 U.S.C. 154(b) by 185 days.

(21) Appl. No.: 10/389,673

(22) Filed: Mar. 14, 2003

(65) Prior Publication Data
US 2004/0179806 A1  Sep. 16, 2004

(51) Int. Cl.
*G02B 6/10* (2006.01)

(52) U.S. Cl. .................................... 385/146; 385/43

(58) Field of Classification Search ................. 385/43, 385/146
See application file for complete search history.

(56) References Cited

U.S. PATENT DOCUMENTS

| | | | | |
|---|---|---|---|---|
| 5,701,379 A | * | 12/1997 | Takeuchi | 385/131 |
| 6,167,172 A | * | 12/2000 | Kunkee et al. | 385/28 |
| 6,483,967 B1 | * | 11/2002 | Tang et al. | 385/43 |
| 6,819,839 B1 | * | 11/2004 | Zheng et al. | 385/43 |

* cited by examiner

*Primary Examiner*—Jennifer Doan
(74) *Attorney, Agent, or Firm*—Fish & Richardson P.C.

(57) ABSTRACT

An apparatus having a waveguide with a first tapered surface and a photodetector with a second surface shaped to mate with the first tapered surface.

17 Claims, 5 Drawing Sheets

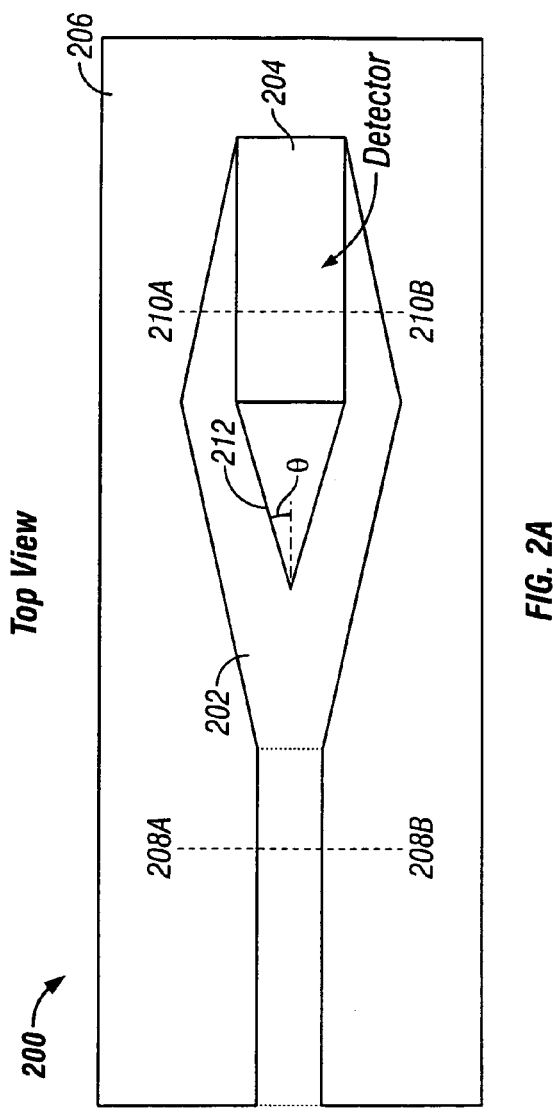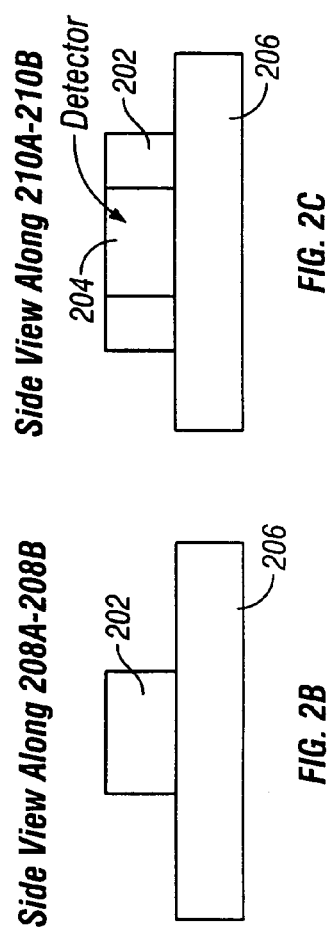

INTEGRATED WAVEGUIDE PHOTODETECTOR

BACKGROUND

A photodetector may absorb radiation and generate an electric current. A waveguide may guide light to the photodetector.

A very high index of refraction detector material (detector) may be "butt coupled" next to a lower index of refraction waveguide. In a conventional butt-coupled waveguide detector, the waveguide may meet the detector at a 90-degree angle. When light in the waveguide meets the detector material, the 90-degree waveguide-detector interface may cause an undesirable backward light reflection, e.g., greater than 25% reflection.

DESCRIPTION OF DRAWINGS

FIG. 2A illustrates a top view of a split waveguide coupled to a detector on a substrate.

FIG. 2B illustrates a cross-sectional side view of the split waveguide on the substrate of FIG. 2A along a line.

FIG. 2C illustrates a cross-sectional side view of the split waveguide coupled to a detector on a substrate of FIG. 2A along another line.

Like reference symbols in the various drawings indicate like elements.

DETAILED DESCRIPTION

The application relates to a highly-efficient, butt-coupled, integrated waveguide photodetector and methods of fabricating the waveguide photodetector. An angle of interface between the waveguide and the photodetector may be kept relatively small, such as ten to sixty degrees. The interface may reduce back reflection loss of light (optical backscatter) into the waveguide.

In addition, the waveguide may be tapered such that the waveguide no longer supports the guided mode of light and aids in transferring light to the detector. There are only certain allowed states in a waveguide. These states may be called "modes." The waveguide may be "single mode" if it only supports one mode. Multimode waveguides contain many modes. An analogy of a mode may be thought of as a probability function, where the mode is similar to electron shells in atoms. An electron is confined in a shell, just as a photon is found in its mode. By changing the shape of the waveguide, the waveguide mode can no longer be supported, and light may be expelled, directed, steered or "forced" out of the waveguide and into the higher index detector. Thus, the tapered waveguide may further increase a coupling efficiency.

An aspect of the application relates to an apparatus comprising a waveguide having a first tapered surface and a photodetector having a second surface. The second surface is shaped to mate with the first tapered surface. As used herein, "mate" may mean fit or accommodate the size and shape of another surface.

Figure 1A:
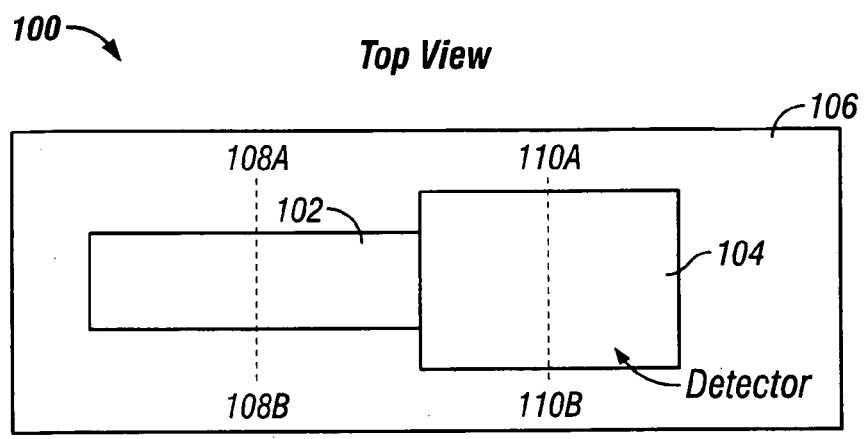
FIG. 1A illustrates a top view of a conventional butt-coupled waveguide and detector on a substrate.
Figure 1B:
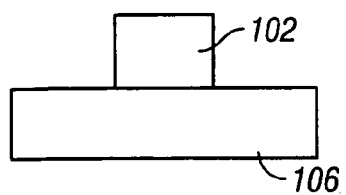
FIG. 1B illustrates a cross-sectional side view of the waveguide and the substrate of FIG. 1A along a line.
Figure 1C:
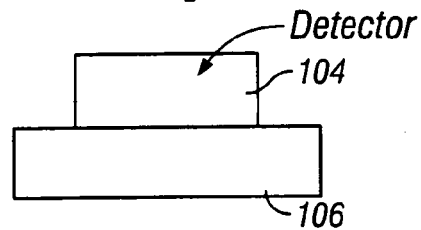
FIG. 1C illustrates a cross-sectional side view of the detector and substrate of FIG. 1A along another line.

FIG. 1A illustrates a top view of a conventional butt-coupled waveguide detector 100. The waveguide detector 100 comprises a waveguide (WG) 102, a detector 104, and a base or substrate 106. FIG. 1B illustrates a cross-sectional side view of the waveguide 102 and the substrate 106 of FIG. 1A along a line 108A–108B. FIG. 1C illustrates a cross-sectional side view of the detector 104 and substrate 106 of FIG. 1A along a line 110A-110B.

A conventional butt-coupled waveguide (WG) detector, such as the waveguide detector 100 in FIG. 1, may have the waveguide 102 meeting the detector 104 at a 90-degree angle. The waveguide 102 may comprise a waveguide material, such as silicon nitride, with an index of refraction of 2.0 at 850 nm. The detector 104 may comprise a detector material, such as Ge, with an index of refraction of 4.5 at 850 nm.

The large difference between the indices of refraction of the waveguide 102 and detector 104 may create problems in attempting to butt-couple light from a waveguide 102 directly into a detector 104.

When a detector 104 with a very high index of refraction is butt coupled next to a silicon nitride waveguide 102, the waveguide detector configuration 100 in FIG. 1 can lead to an undesirable backward light reflection (backscatter) of greater than 25%.

Figure 1D:
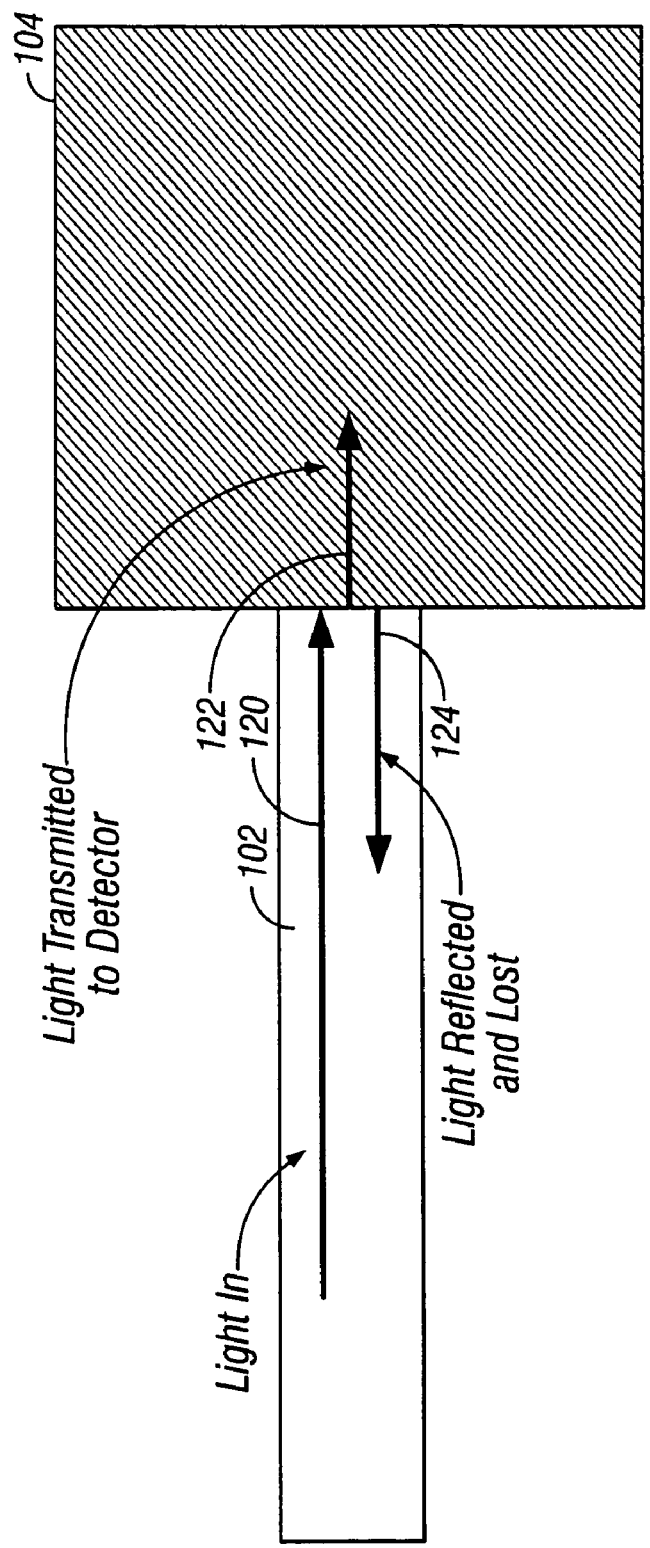
FIG. 1D illustrates a reflection problem in state of the art butt-coupled detectors.

FIG. 1D illustrates a reflection problem in state of the art butt-coupled detectors. Light 120 in the waveguide 102 comes toward the detector 104. Some light 122 is transmitted to the detector, and some light 124 is reflected by the surface of the detector 104 and lost.

The reflection of light reflecting off the higher index Ge detector 104 when the light is normal to the Ge detector surface (current state of the art) may be defined by the following equation:

Reflection=$[(a-1)/(a+1)]$

In the equation above, "a" is the ratio of (index of refraction for Ge)/(index of refraction for SIN). Using the values above, "a"=4.5/2.0=2.25. This may produce a 15% reflection. The reflected light may not be detected by the detector 104. In addition, the reflected light may become noise as it travels backward through the waveguide 102 and an optical system.

An anti-reflective (AR) layer may be added between the waveguide 102 and the detector 104 to reduce the reflection, but this may add significant fabrication process complexity.

Various geometries of the waveguide-detector interface are described with reference to FIGS. 2–4. The waveguide-detector interfaces in FIGS. 2–4 enable light to be transferred from the waveguide 202, 302 efficiently into the detector medium 204, 304.

FIG. 2A illustrates a top view of a split waveguide 202 coupled to a detector 204 on a substrate 206. FIG. 2B illustrates a cross-sectional side view of the split waveguide 202 on the substrate 206 of FIG. 2A along a line 208A–208B. FIG. 2C illustrates a cross-sectional side view of the split waveguide 202 coupled to a detector 204 on a substrate 206 of FIG. 2A along another line 210A–210B.

The waveguides described here may be made of any medium transparent to a wavelength of light and having a cladding with a lower index of refraction. Examples of waveguide materials include silicon, the thin silicon layer in SOI (silicon on insulator), glass, oxides, nitrides, e.g., silicon nitride, polymers, semiconductors or other suitable materials.

The optical photodetectors described herein may be selected from a number of materials in which light induces electrical carriers (electrons and holes) usually through an absorption process, and the carriers can be collected and converted to current. Examples of photodetector materials include Ge, InP, GaAs, other II–VI materials, Si, polymer or other suitable materials.

The interface 212 between the waveguide 202 and the detector 204 may be called a "waveguide-to-photodetector coupler" or "coupling structure." The waveguide 202 may have a very smooth surface, which helps reduce optical loss.

An angle (theta) between a general left-to-right direction of light in the waveguide 202 in FIG. 2A (longitudinal axis of the waveguide 202) and a mating surface of the detector 204 may be less than ninety degrees. For example, the angle may be selected from a range of ten to sixty degrees, e.g., forty-five degrees. At ten degrees, the waveguide 202 is nearly parallel to the mating surface of the detector 204.

The waveguide 202 may be made by a lithographic/etch process (described below) out of a transparent medium. The detector 204 may be a complementary metal oxide semiconductor (CMOS) compatible photodetector or phototransistor. The detector 204 may generate photo-induced electronic carriers, i.e., radiation/photons entering the detector 204 may induce charge, which can be output by the detector 204. There may be many methods of collecting the generated current from the detector 204.

In FIG. 2, the surface of the photodetector 204 may a have a wedge shape, and the tapered surface of the waveguide 202 may be shaped to fit around the wedge-shaped photodetector surface. Alternatively, in FIGS. 3A, 3B, and 3C, the tapered surface of the waveguide 302 may have a wedge shape, and the surface of the photodetector 304 may be shaped to fit around the wedge-shaped waveguide surface.

Figure 3A:
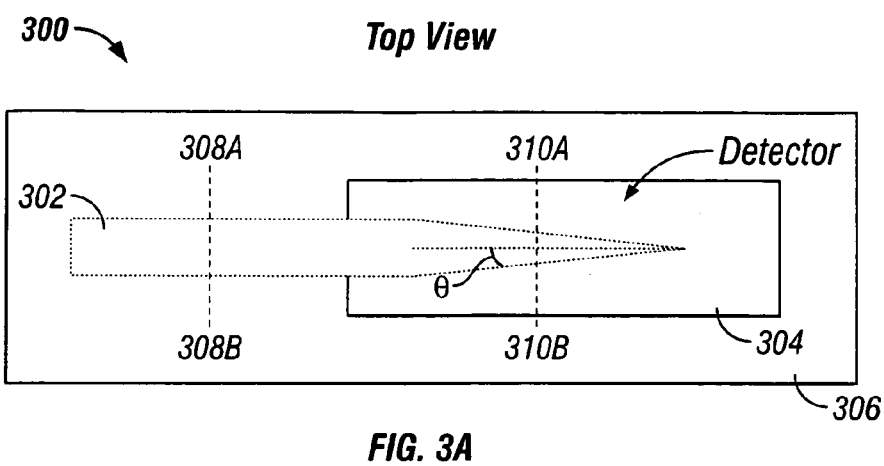
FIG. 3A illustrates a top view of a tapered, low angle waveguide butt-coupled to a detector on a substrate.
Figure 3B:
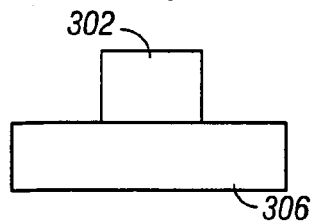
FIG. 3B illustrates a cross-sectional side view of the tapered, low angle, butt-coupled waveguide on the substrate of FIG. 3A along a line.
Figure 3C:
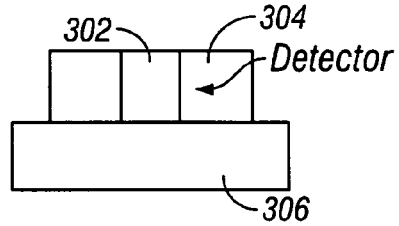
FIG. 3C illustrates a cross-sectional side view of the tapered low angle, butt-coupled waveguide and detector on the substrate of FIG. 3A along another line.

FIG. 3A illustrates a top view of a tapered, low angle, butt-coupled waveguide 302 and a detector 304. FIG. 3B illustrates a cross-sectional side view of the tapered, low angle, butt-coupled waveguide 302 on the substrate 306 of FIG. 3A along a line 308A–308B. FIG. 3C illustrates a cross-sectional side view of the tapered, low angle, butt-coupled waveguide coupled to the detector 304 on the substrate 306 of FIG. 3A along another line 310A–310B.

An angle (theta) between a general left-to-right direction of light in the waveguide 302 in FIG. 3A (longitudinal axis of the waveguide 302) and a mating surface of the detector 304 may be less than ninety degrees. For example, the angle may be selected from a range of ten to sixty degrees, e.g., forty-five degrees. At ten degrees, the waveguide 302 is nearly parallel to the mating surface of the detector 304.

The proposed structures in FIGS. 2 and 3 both have the waveguides 202, 302 incident upon the detectors 204, 304 at relatively low angles.

Figure 4:
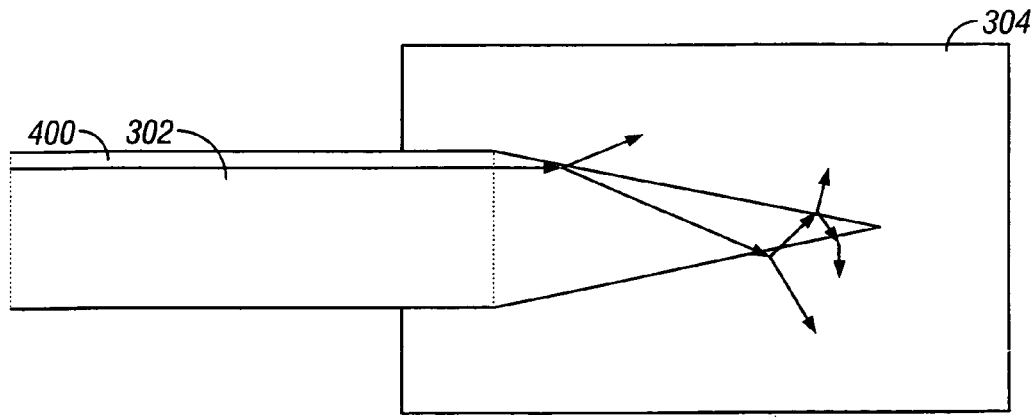
FIG. 4 illustrates forward scattered light of the tapered low angle, butt-coupled waveguide and detector of FIG. 3A.

FIG. 4 illustrates forward scattered light rays 400 of the tapered low angle, butt-coupled waveguide 302 and detector 304 of FIG. 3A. The light rays 400 may be reflected into the waveguide 302 and refracted into the detector 304, but will not bounce backwards. The light 400 in the waveguide 302 may continue to undergo this process until the light 400 is substantially all absorbed by the detector 304.

The waveguides 202, 302 in both FIGS. 2 and 3 may taper as they end. As the waveguides 202, 302 taper, the waveguides 202, 302 may no longer be able to support a stable waveguide mode. If the waveguide material becomes smaller and smaller in a taper, eventually, the waveguide may no longer support carrying the light in a stable mode. The light will be expelled and leak out of the waveguide. The light may be pulled towards and go into the higher index detector materials 204, 304. The length(s) of the taper may be determined, e.g., about 1 to 10 microns for Ge, such that the light is fully absorbed by the detectors 204, 304 by the time the light reaches the ends of the waveguides 202, 302, as shown in FIG. 4.

The waveguide and detector geometries are not limited to the structures 200, 300 shown in FIGS. 2 and 3. An aspect of the geometries is a low incident angle of the waveguide 202, 302 upon the detector 204, 304, such that light is not reflected backwards but forward into the detector 204, 304. In addition, the tapered interface may force the light out of the waveguide 202, 302 and into the detector 204, 304.

Figure 5:
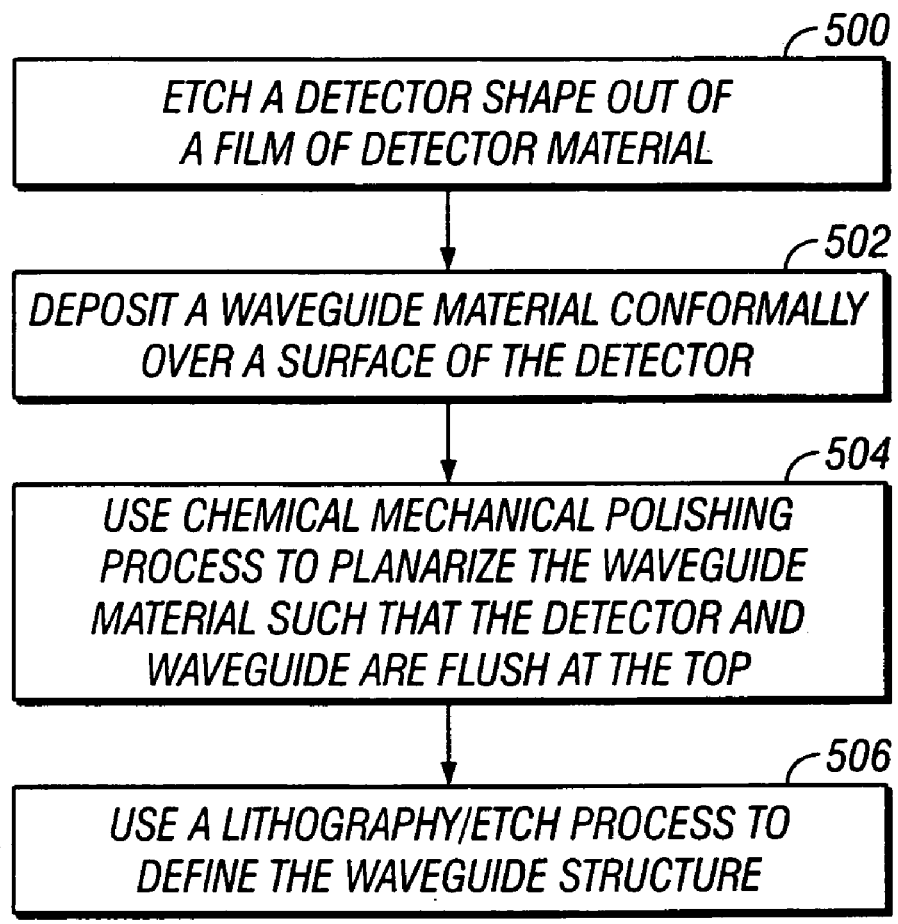
FIG. 5 illustrates a method of making a tapered, low angle waveguide butt-coupled to a detector in FIG. 2 or FIG. 3.

FIG. 5 illustrates a method of making a tapered, low angle waveguide butt-coupled to a detector in FIG. 2 or FIG. 3. The method may etch a detector shape shown in FIG. 2 or FIG. 3 out of a film of detector material at 500. The method may then deposit a waveguide material conformally over a surface of the detector at 502. A chemical mechanical polishing process (CMP) may be used to planarize the waveguide material such that the detector and waveguide are flush at the top at 504. Next, a lithography/etch process may be used to define the waveguide structure at 506. There may be other ways of making the waveguide/detector structure.

A number of embodiments have been described. Nevertheless, it will be understood that various modifications may be made without departing from the spirit and scope of the application. Accordingly, other embodiments are within the scope of the following claims.

What is claimed is:

1. An apparatus comprising:
   a waveguide having a first tapered surface; and
   a photodetector having a second surface shaped to mate with the first tapered surface, wherein the second surface of the photodetector has a wedge shape, and the first tapered surface of the waveguide is shaped to fit around the wedge-shaped second surface.

2. The apparatus of claim 1, wherein the photodetector is made of Ge.

3. The apparatus of claim 1, wherein the waveguide is made of silicon nitride.

4. The apparatus of claim 1, further comprising a substrate on which the waveguide and the photodetector are formed, and wherein the photodetector is positioned in a common plane with the waveguide.

5. The apparatus of claim 1, wherein the waveguide is planarized with a top surface of the photodetector.

6. The apparatus of claim 1, wherein the waveguide comprises silicon.

7. The apparatus of claim 1, wherein the waveguide comprises silicon.

8. The apparatus of claim 1, wherein the waveguide comprises a silicon layer in a silicon on insulator structure.

9. The apparatus of claim 1, wherein the waveguide comprises a glass.

10. The apparatus of claim 1, wherein the waveguide comprises an oxide.

11. The apparatus of claim 1, wherein the waveguide comprises a polymer.

12. The apparatus of claim 1, wherein the waveguide comprises a semiconductor.

13. The apparatus of claim 1, wherein the photodetector comprises material II–VI semiconductor material.

14. The apparatus of claim 1, wherein the photodetector comprises Si.

15. The apparatus of claim 1, wherein the photodetector comprises a polymer.

16. The apparatus of claim 1, wherein the photodetector comprises InP.

17. The apparatus of claim 1, wherein the photodetector comprises GaAs.

* * * * *